United States Patent
Osada

(10) Patent No.: US 11,245,808 B1
(45) Date of Patent: Feb. 8, 2022

(54) IMAGE FORMING APPARATUS FOR GENERATING RECONFIGURED IMAGE BY ARRANGING PAPER PIECE IMAGES, IMAGE FORMING METHOD FOR GENERATING RECONFIGURED IMAGE BY ARRANGING PAPER PIECE IMAGES, AND NON-TRANSITORY COMPUTER READABLE RECORDING MEDIUM THAT STORES IMAGE FORMING PROGRAM FOR GENERATING RECONFIGURED IMAGE BY ARRANGING PAPER PIECE IMAGES

(71) Applicant: KYOCERA DOCUMENT SOLUTIONS INC., Osaka (JP)

(72) Inventor: Yoshihiro Osada, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/037,827

(22) Filed: Sep. 30, 2020

(51) Int. Cl.
*H04N 1/23* (2006.01)
*H04N 1/00* (2006.01)
*H04N 1/393* (2006.01)
*B41M 3/00* (2006.01)

(52) U.S. Cl.
CPC ........ *H04N 1/2323* (2013.01); *B41M 3/005* (2013.01); *H04N 1/00679* (2013.01); *H04N 1/233* (2013.01); *H04N 1/393* (2013.01)

(58) Field of Classification Search
None
See application file for complete search history.

(56) References Cited

U.S. PATENT DOCUMENTS

| 10,353,652 | B2* | 7/2019 | Herrmann | G06F 3/1234 |
| 2004/0254008 | A1 | 12/2004 | Anderson et al. | |
| 2005/0168775 | A1* | 8/2005 | Liu | H04N 1/00188 358/1.15 |
| 2005/0194780 | A1 | 9/2005 | Shockley | |
| 2014/0035988 | A1* | 2/2014 | Naruse | B41J 11/663 347/16 |
| 2015/0310697 | A1 | 10/2015 | O'Hagan | |
| 2019/0286397 | A1* | 9/2019 | Ito | H04N 1/3872 |
| 2020/0065034 | A1* | 2/2020 | Nose | H04N 1/00358 |

\* cited by examiner

*Primary Examiner* — Miya J Williams
(74) *Attorney, Agent, or Firm* — Li & Cai Intellectual Property (USA) Office

(57) ABSTRACT

An image forming method includes: determining a number of copies; obtaining an original image including an object of a paper piece; detecting a paper piece size, the paper piece size being a size of the object of the paper piece included in the original image; clipping the object of the paper piece having the paper piece size from the original image to generate a paper piece image; and arranging the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies.

17 Claims, 5 Drawing Sheets

IMAGE FORMING APPARATUS FOR GENERATING RECONFIGURED IMAGE BY ARRANGING PAPER PIECE IMAGES, IMAGE FORMING METHOD FOR GENERATING RECONFIGURED IMAGE BY ARRANGING PAPER PIECE IMAGES, AND NON-TRANSITORY COMPUTER READABLE RECORDING MEDIUM THAT STORES IMAGE FORMING PROGRAM FOR GENERATING RECONFIGURED IMAGE BY ARRANGING PAPER PIECE IMAGES

FIELD OF THE DISCLOSURE

The present disclosure relates to an image forming apparatus that forms an image including a paper piece object. The present disclosure further relates to an image forming method and a non-transitory computer readable recording medium that stores an image forming program.

BACKGROUND OF THE DISCLOSURE

Paper pieces (for example, message cards, raffle tickets for lottery, etc.) are created to give them to a plurality of people.

SUMMARY OF THE DISCLOSURE

According to an embodiment of the present disclosure, there is provided an image forming apparatus, including:
a controller circuitry that executes an image forming program to operate as
a variable determining module configured to determine a number of copies,
an image obtaining module configured to obtain an original image including an object of a paper piece,
a size detector module configured to detect a paper piece size, the paper piece size being a size of the object of the paper piece included in the original image,
a clipper module configured to clip the object of the paper piece having the paper piece size from the original image to generate a paper piece image, and
a reconfiguring module configured to arrange the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies.

According to an embodiment of the present disclosure, there is provided an image forming method, including:
determining a number of copies;
obtaining an original image including an object of a paper piece;
detecting a paper piece size, the paper piece size being a size of the object of the paper piece included in the original image;
clipping the object of the paper piece having the paper piece size from the original image to generate a paper piece image; and
arranging the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies.

According to an embodiment of the present disclosure, there is provided a non-transitory computer readable recording medium that stores an image forming program executable by a controller circuitry of an image forming apparatus, the image forming program causing the circuitry of the image forming apparatus to operate as
a variable determining module configured to determine a number of copies,
an image obtaining module configured to obtain an original image including an object of a paper piece,
a size detector module configured to detect a paper piece size, the paper piece size being a size of the object of the paper piece included in the original image,
a clipper module configured to clip the object of the paper piece having the paper piece size from the original image to generate a paper piece image, and
a reconfiguring module configured to arrange the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Hardware Configuration of Image Forming Apparatus

Figure 1:
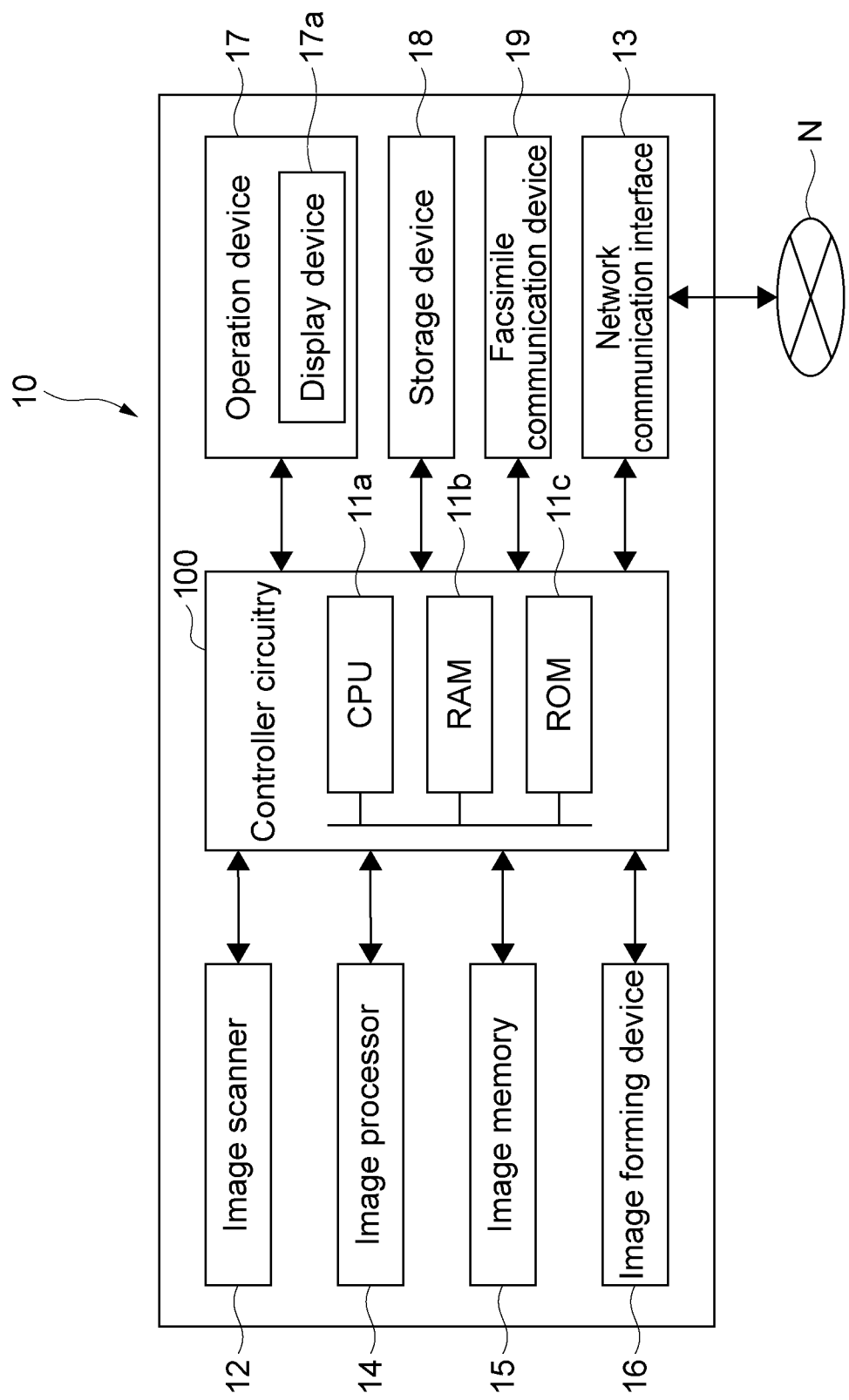
FIG. 1 shows a hardware configuration of an image forming apparatus.

FIG. 1 shows a hardware configuration of an image forming apparatus.

The image forming apparatus 10 includes the controller circuitry 100. The controller circuitry 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs (including image processing program) stored in the ROM 11c in the RAM 11b and executes the image forming programs. The ROM 11c is a nonvolatile memory that stores programs executable by the CPU 11a, data, and the like. The ROM 11c is an example of a non-transitory computer readable recording medium.

The controller circuitry 100 is connected to the image scanner 12, the image processor 14 (including GPU (Graphics Processing Unit)), the image memory 15, the image forming device 16 (printer device), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 including the display device 17a (touch panel) is one mode of an input device. A sound input device including a microphone may be provided as an input device.

2. Functional Configuration of Image Forming Apparatus

Figure 2:
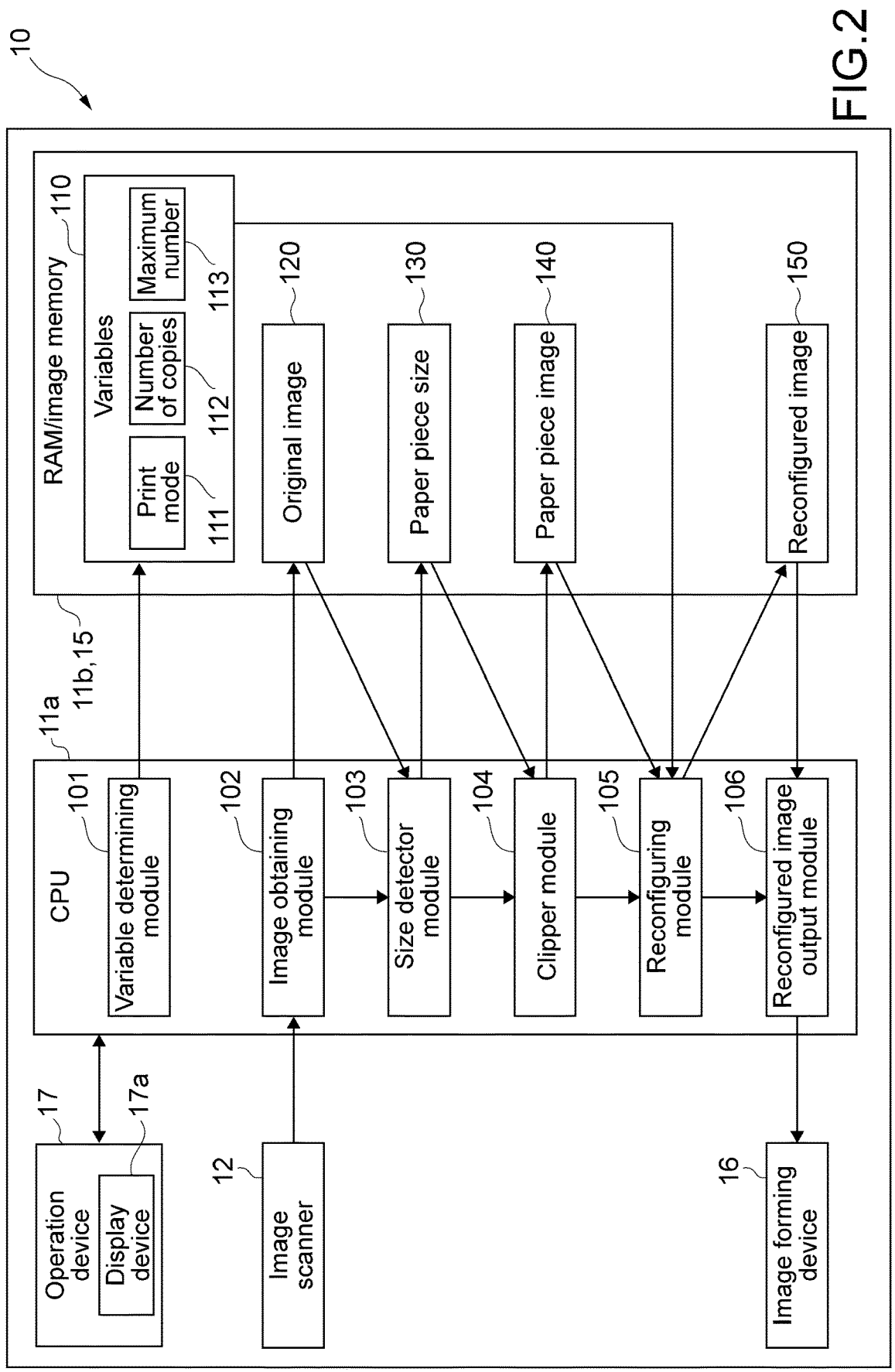
FIG. 2 is a functional configuration of the image forming apparatus.

FIG. 2 is a functional configuration of the image forming apparatus.

In the controller circuitry 100 of the image forming apparatus 10, the CPU 11a loads an image forming program stored in the ROM 11c in the RAM 11b and executes the image forming program to operate as the variable determining module 101, the image obtaining module 102, the size detector module 103, the clipper module 104, the reconfiguring module 105, and the reconfigured image output module 106.

3. Operational Flow of Image Forming Apparatus

Figure 3:
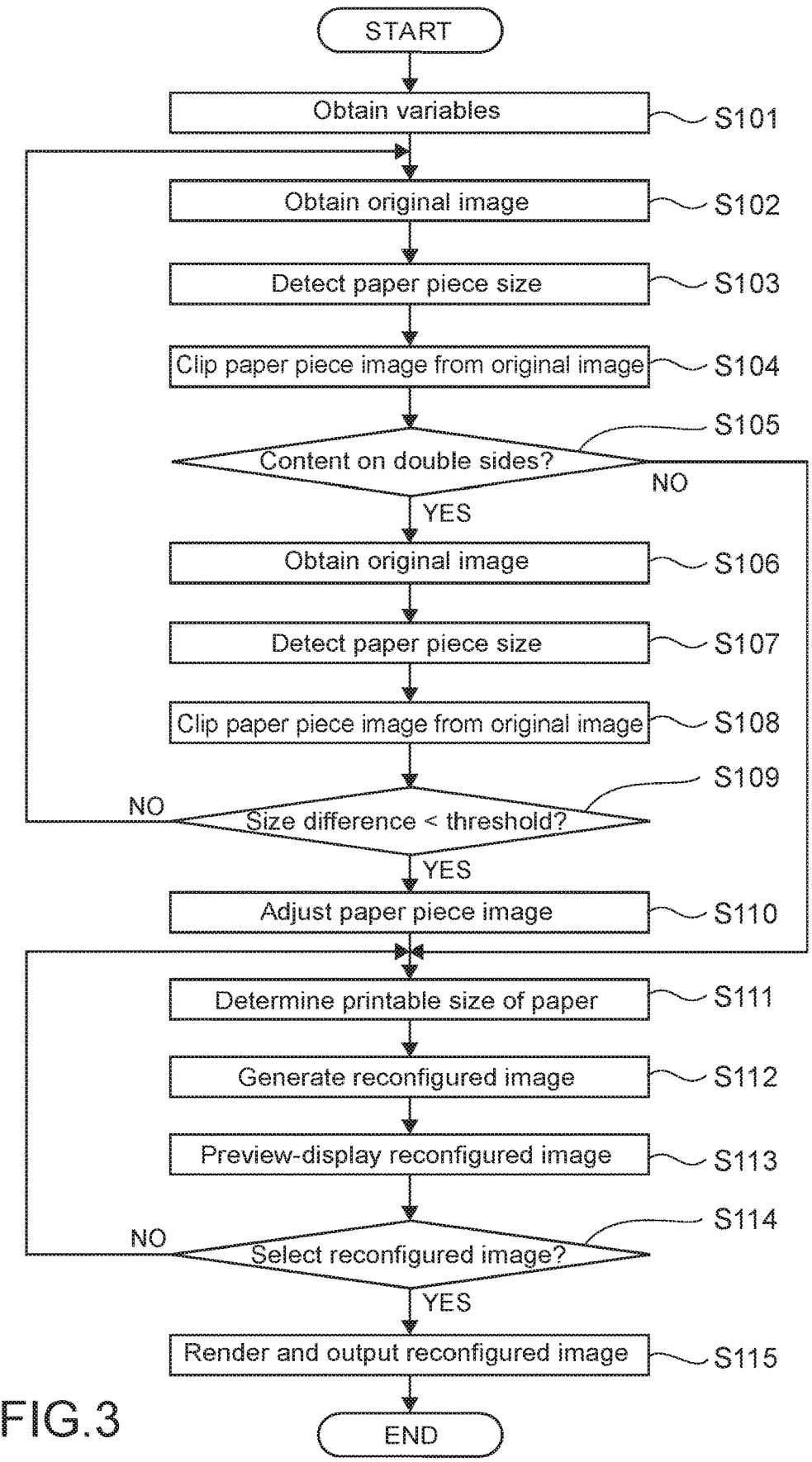
FIG. 3 shows an operational flow of the image forming apparatus.

FIG. 3 shows an operational flow of the image forming apparatus.

A typical use case of the present embodiment will be described. A user has one physical original paper piece. One paper piece is smaller than a typical print paper size (A4, letter, etc.), and typically has a substantially rectangular shape. A paper piece may be, for example, a message card, a raffle ticket for lottery, a pass, direct mail, a Christmas card, or the like. The original paper piece may be a printed finished product without handwritten letters, or a printed finished product with handwritten letters (for example, user name). A user (for example, school teacher) wants to create (i.e., print) paper pieces to give them to a plurality of people (for example, students). Content of created paper pieces may be totally the same or partially different from one another. Examples of the case where content of created paper pieces is partially different from one another includes a case where message cards have different names (students' names), a case where raffle tickets have different lottery random numbers, a case where paper pieces have unique identifiers (serial numbers, etc.) for copy protection, a case where paper pieces have two dimensional codes or barcodes, a case where paper pieces have serial numbers, and the like.

The variable determining module 101 determines the number of copies of paper pieces to be created. For example, the variable determining module 101 allows a user to input variables via the display device 17a and the operation device 17. Specifically, a user turns on the paper piece print mode, inputs the number of copies of paper pieces to be created, and validate or invalidate the maximum number. To "invalidate the maximum number" means that the number of paper pieces created is completely the same as the input number of copies, and will be also referred to as "specified number". Meanwhile, to "validate the maximum number" means that, where print paper has a space, paper pieces of the maximum number of copies are created utilizing the space for extra (i.e., spare) copies. Alternatively, the variable determining module 101 may automatically determine the number of copies instead of determining the number of copies manually input. For example, the variable determining module 101 may determine, as the number of copies of paper pieces to be created, the maximum number of the paper piece size 130 within print paper based on the paper piece size 130 (described later) detected by the size detector module 103 and the size of print paper, and validate the maximum number 113. The variable determining module 101 stores the variables 110 (the paper piece print mode 111, the number of copies 112, and validation or invalidation of the maximum number 113) in the RAM 11b (Step S101).

The image obtaining module 102 obtains an original image including an object of a paper piece. For example, a user puts the front side of one original paper piece on the platen (typically, predetermined position such as left rear corner) of the image scanner 12, and operates the operation device 17 to start optically reading an image. The image obtaining module 102 obtains the image (original image) obtained by optically reading the paper piece by the image scanner 12. Alternatively, the image obtaining module 102 may obtain an electric original image generated by the image forming apparatus 10 or a terminal device (personal computer, smartphone, etc. Not shown). The image obtaining module 102 processes the obtained original image to remove unnecessary content (for example, noise such as stains or shades), and generates the original image 120 including validate content (Step S102).

The size detector module 103 detects the edge of the object of the paper piece included in the original image 120. Thus the size detector module 103 detects the size (paper piece size) 130 of the object of the paper piece included in the original image 120, and detects the location (coordinates) of the object of the paper piece in the original image 120 (Step S103).

The clipper module 104 clips, from the original image 120, the object of the paper piece that locates on the coordinates and has the paper piece size 130 detected by the size detector module 103. As a result, the clipper module 104 generates the paper piece image 140 (Step S104).

Where the original paper piece has content on the double sides, the user puts the back side of one original paper piece on the platen (typically, predetermined position such as left rear corner) of the image scanner 12, and operates the operation device 17 to start optically reading an image (Step S105, YES). Similar to the case of the front side, the image obtaining module 102 generates the original image 120 (Step S106), the size detector module 103 detects the paper piece size 130 and the coordinates (Step S107), and the clipper module 104 generates the paper piece image 140 (Step S108).

The clipper module 104 compares the paper piece sizes 130 of the double sides one another (Step S109). The paper piece sizes 130 of the double sides may be substantially different from one another because of the angle and floating of the original paper piece on the platen, detection errors of the paper piece size 130 or the coordinates, and other reasons. Where the difference between the paper piece sizes 130 of the double sides is smaller than a threshold (Step S109, YES), the clipper module 104 adjusts the paper piece image 140 of one side (front side or back side), which has the smaller paper piece size 130, with reference to the paper piece image 140 of the other side, which has the larger paper piece size 130. Specifically, the clipper module 104 adjusts (i.e., centers) the center point of the smaller paper piece image 140 of one side (front side or back side) on the center point of the larger paper piece image 140. Further, where the orientations of the paper piece images 140 of the double sides are different from one another, the clipper module 104 rotates the paper piece image 140 of one side, and generates the paper piece images 140 of the double sides having the same orientation. As a result, the clipper module 104 generates the paper piece images 140 of the double sides having the same size and the same orientation (Step S110).

Meanwhile, where the difference between the paper piece sizes 130 of the double sides is equal to or larger than the threshold (Step S109, NO), the user again puts the double sides of the original paper piece on the platen. The image forming apparatus 10 optically re-reads the double sides of the paper piece, and re-generates the paper piece images 140 of the double sides (Step S102 to Step S110).

The reconfiguring module 105 allows the user to input the print paper size (A4, letter, etc.) via the display device 17*a* and the operation device 17. The reconfiguring module 105 obtains the input print paper size, and determines the size (printable size) of the printable area (area excluding edge margin as necessary) of the print paper of that size (Step S111). The reconfiguring module 105 calculates, based on the printable size and the paper piece size 130 and based on the number of copies 112 and validation or invalidation of the maximum number 113, the arrangement of the multiple paper piece images 140 on one or more printable areas (one or more pages) and the number of papers necessary for printing. The reconfiguring module 105 arranges the multiple paper piece images 140 on the one or more printable areas and adds other necessary images to generate the reconfigured image 150 (Step S112). The reconfiguring module 105 preview-displays the reconfigured image 150 and additional information (e.g., the number of papers required for printing) on the display device 17*a*. The reconfiguring module 105 may generate reconfigured images 150 of multiple different patterns (details will be described later), and may preview-display the reconfigured images 150 (Step S113).

The user inputs whether to print any one preview-displayed reconfigured image 150 via the operation device 17 (Step S114). Where the preview-displayed reconfigured image 150 is to be printed (Step S114, YES), the reconfigured image output module 106 outputs the reconfigured image 150. For example, the reconfigured image output module 106 renders the selected reconfigured image 150 in a format (typically, bitmap format) printable by the image forming device 16 (printer device), and outputs the rendered reconfigured image 150 to the image forming device 16 (Step S115). Alternatively, the reconfigured image output module 106 may convert the reconfigured image 150 into a file of a different format, and may send the file via the network N or store the file in the nonvolatile storage device 18 for later output.

Meanwhile, where a user wants to generate and print another reconfigured image different from any reconfigured images 150 preview-displayed (Step S114, NO), the reconfiguring module 105 repeats Step S111 and thereafter.

4. Method of Generating Reconfigured Image by Reconfiguring Module (Step S112)

4-1. Example 1

Figure 4:
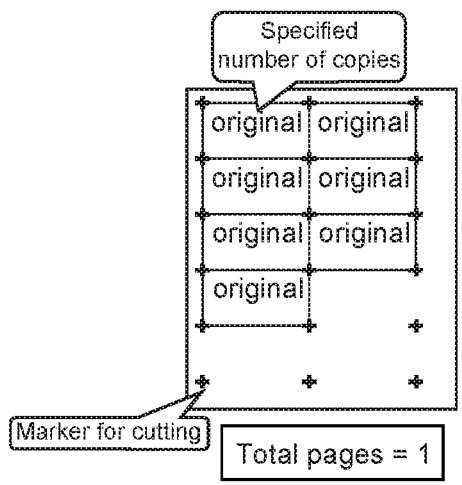
FIG. 4 shows an example of a reconfigured image of Example 1 where a specified number of paper pieces are created.

FIG. 4 shows an example of a reconfigured image of Example 1 where a specified number of paper pieces are created.

In the below-described case, the number of copies 112 "7" is set as the number of paper pieces to be created, and the maximum number print 113 is invalidate. The reconfiguring module 105 arranges the paper piece images 140, the number of which is the same as the number of copies 112 "7" and the size of which is unchanged (scaling=100%), on the printable area of one page.

Figure 5:
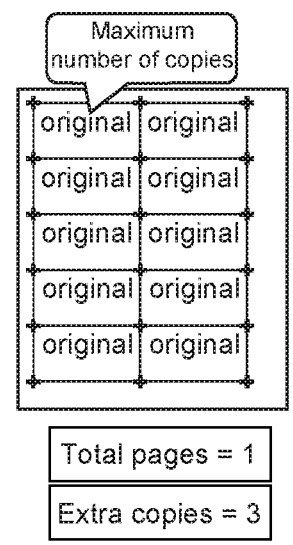
FIG. 5 shows an example of a reconfigured image of Example 1 where the maximum number of paper pieces are created.

FIG. 5 shows an example of a reconfigured image of Example 1 where the maximum number of paper pieces are created.

In the below-described case, the number of copies 112 "7" is set as the number of paper pieces to be created, and the maximum number print 113 is validate. The reconfiguring module 105 arranges the paper piece images 140, the number of which is the same as the number of copies 112 "7" and the size of which is unchanged (scaling=100%), on the printable area of one page. Where the paper piece images 140, the number of which is the same as the number of copies 112 "7", are arranged on the printable area, the printable area still has a space. The reconfiguring module 105 thus further arranges paper piece images, the number of which is the maximum number (3) arrangeable in the space. In this example, the reconfiguring module 105 arranges the paper piece images 140, the number of which is the maximum number (in this example, 7+3=10) within the space of the printable area, in the printable area of one page.

The reconfigured image 150 adds images of guides for dividing the multiple paper piece images 140 (guide images) to generate the reconfigured image 150. In the examples of FIG. 4 and FIG. 5, the guide images are cross markers (+) showing all the corners of the rectangular paper piece images 140. The guide images are guides for cutting print paper (after printed) into paper pieces.

4-2. Example 2

In Example 2, the number of copies 112 "12" is set as the number of paper pieces to be created, and the maximum number print 113 is invalidate.

Figure 6:
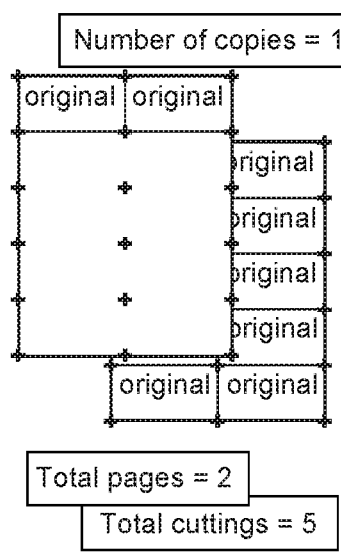
FIG. 6 shows an example of a reconfigured image of Example 2 where a specified number of paper pieces are created.

FIG. 6 shows an example of a reconfigured image of Example 2 where a specified number of paper pieces are created.

The reconfiguring module 105 arranges the paper piece images 140, the number of which is the same as the number of copies 112 "12" and the size of which is unchanged (scaling=100%), on the printable area. Specifically, the reconfiguring module 105 tiles the paper piece images 140 as many as possible (5×2=10) without clearances on the printable area of the 1st sheet of print paper. Then the reconfiguring module 105 tiles the two rest paper piece images 140 without clearances on the printable area of the 2nd sheet of print paper. The reconfiguring module 105 adds the guide images (cross markers) to thereby generate the reconfigured image 150.

A method of cutting the two sheets of print paper (after printed) into paper pieces will be described. Firstly, one sheet of print paper is put on the other sheet of print paper (two sheets are overlaid). The overlaid sheets stack is cut once (vertical cut line), and the overlaid sheets stack is thereby divided into two equal parts side-to-side. Next, one part (one overlaid-and-cut sheets stack of print paper) is put on the other part (the other overlaid-and-cut sheets stack of print paper) (2×2=4 sheets are overlaid). The overlaid sheets stack is cut four times (horizontal cut lines), and the overlaid sheets stack is thereby divided into five equal parts from top to bottom. The two sheets of print paper are thereby divided into paper pieces. As a result, each of the two sheets of print paper is divided into ten equal pieces. In short, where the twelve paper piece images 140 are arranged as shown in FIG. 6, the number of total cuttings is 1+4=5 times.

Figure 7:
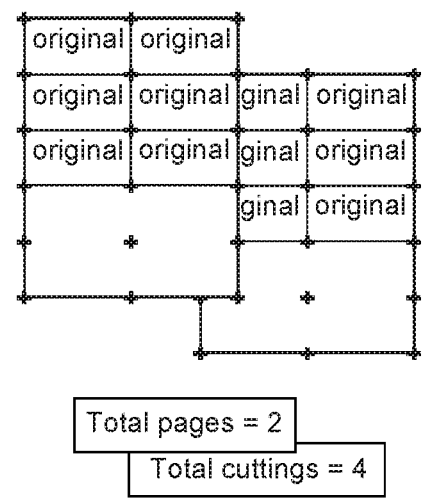
FIG. 7 shows another example of a reconfigured image of Example 2 where a specified number of paper pieces are created (number of total cuttings is reduced)

FIG. 7 shows another example of a reconfigured image of Example 2 where a specified number of paper pieces are created (number of total cuttings is reduced).

The reconfiguring module 105 arranges the paper piece images 140, the number of which is the same as the number of copies 112 "12" and the size of which is unchanged (scaling=100%), on the printable area of the print paper. Specifically, the reconfiguring module 105 arranges the paper piece images 140 on the printable area such that the number of total cuttings is minimum, where paper on which the reconfigured image 150 is printed is to be cut into paper pieces. In this example, the reconfiguring module 105 tiles the same number (12/2=6) of the paper piece images 140 without clearances on the printable area of each of the 1st and 2nd sheets of print paper with the same layout (3×2=6). The reconfiguring module 105 adds the guide images (cross markers) to thereby generate the reconfigured image 150.

A method of cutting the two sheets of print paper (after printed) into paper pieces will be described. Firstly, one sheet of print paper is put on the other sheet of print paper (two sheets are overlaid). The overlaid sheets stack is cut once (vertical cut line), and the overlaid sheets stack is thereby divided into two equal parts side-to-side. Next, one part (one overlaid-and-cut sheets stack of print paper) is put on the other part (the other overlaid-and-cut sheets stack of print paper) (2×2=4 sheets are overlaid). The overlaid sheets stack is cut three times (horizontal cut lines), and the overlaid sheets stack is thereby divided into three equal parts from top to bottom. The two sheets of print paper are thereby divided into paper pieces (lower space is not cut anymore). As a result, each of the two sheets of print paper is divided into six equal pieces (lower space remains). In short, where the twelve paper piece images 140 are arranged as shown in FIG. 7, the number of total cuttings is 1+3=4 times. In short, the number of total cuttings of the arrangement of FIG. 7 is less than the number of total cuttings of the arrangement of FIG. 6.

Figure 8:
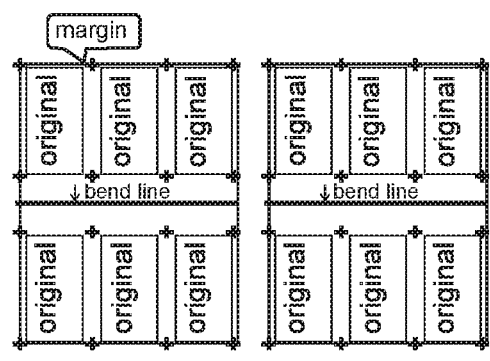
FIG. 8 shows another example of a reconfigured image of Example 2 where a specified number of paper pieces are created (number of total cuttings is further reduced).

FIG. 8 shows another example of a reconfigured image of Example 2 where a specified number of paper pieces are created (number of total cuttings is further reduced).

The reconfiguring module 105 arranges the paper piece images 140 on the printable area such that the number of total cuttings is minimum, where paper on which the reconfigured image 150 is printed is to be cut into paper pieces. In this example, the reconfiguring module 105 arranges the same number (12/2=6) of the paper piece images 140 spaced uniformly (i.e., with margins) on the printable area of each of the 1st and 2nd sheets of print paper with the same layout (3×2=6). The reconfiguring module 105 adds the guide images (cross markers) and further adds images showing a bend line to thereby generate the reconfigured image 150. In this example, the bend line is the center line about which the three paper piece images 140 arranged in the upper part of the printable area and the three paper piece images 140 arranged in the lower part of the printable area are symmetric. The reconfiguring module 105 adds, as the images showing the bend line, a line image showing the bend line itself and a text image of "(arrow) bend line".

A method of cutting the two sheets of print paper (after printed) into paper pieces will be described. Firstly, one sheet of print paper is put on the other sheet of print paper (two sheets are overlaid). The overlaid sheets stack is bent on the bend line, and four-layered sheets stack is obtained. The four-layered sheets stack is cut once (horizontal cut lines) on the multiple cross markers closest to the bend line in the direction parallel with the bend line (space including bend line remains). Next, the four-layered-and-cut sheets stack is cut twice (vertical cut lines), and is thereby divided into three equal parts side-to-side. The two sheets of print paper are thereby divided into paper pieces. As a result, each of the two sheets of print paper is divided into six equal pieces (space including bend line remains). In short, where the twelve paper piece images 140 are arranged as shown in FIG. 8, the number of total cuttings after bending once is 1+2=3 times. In short, the number of total cuttings of the arrangement of FIG. 8 is less than the numbers of total cuttings of the arrangements of FIG. 6 and FIG. 7. The reconfiguring module 105 may preview-display all the reconfigured images 150 of the arrangements of FIG. 6, FIG. 7, and FIG. 8 (Step S113), and may allow a user to select one desired reconfigured image 150 (Step S114).

Note that, in the examples of FIG. 6 and FIG. 7, the paper piece images 140, the size of which is unchanged (scaling=100%), are arranged. Meanwhile, in the example of FIG. 8, the reconfiguring module 105 downsizes the paper piece image 140, arranges the downsized paper piece images 140 on the printable area, and adds the image showing the bend line on a margin generated as a result of the downsizing. In this way, where the paper piece image 140 is downsized and then the image showing the bend line is added on a margin generated as a result of the downsizing, the paper piece image 140 should be downsized at the least scaling (i.e., with reducing size as less as possible).

In another example, also, where the paper piece image 140 is downsized and then the number of total pages of the reconfigured image 150 is reduced, the paper piece image 140 should be downsized at the least scaling (i.e., with reducing size as less as possible) (not shown).

In another example, in duplex printing, the reconfiguring module 105 may arrange the paper piece images 140 on the printable area such that the paper piece images 140 of the double sides of the same size are arranged on duplex sides to generate the reconfigured images 150 of the double sides, and add the guide image to the reconfigured image 150 of at least one side.

In another example, the reconfiguring module 105 adds a unique object to each of the paper piece images 140 to generate the reconfigured image 150. For example, the reconfiguring module 105 adds different objects (names, lottery random numbers, unique identifiers (serial numbers, etc.) for copy protection, two dimensional codes or barcodes, serial numbers, etc.) to the paper piece images 140. For example, the storage device 18 stores a name list (in educational site such as school, students' name list). The reconfiguring module 105 detects a blank area included in the paper piece image 140. The reconfiguring module 105 reads the list from the storage device 18. The reconfiguring module 105 may add a unique object (students' name in list), which is unique to each paper piece image 140, to the blank area of each of the paper piece images 140 to generate the reconfigured image 150. Where serial numbers are added to the paper piece images 140, the reconfiguring module 105 may generate the serial numbers.

5. Conclusion (1) According to the present embodiment, the size detector module 103 detects the paper piece size 130, the paper piece size being a size of the object of the paper piece included in the original image 120. The clipper module 104 clips the object of the paper piece having the paper piece size 130 from the original image 120 to generate the paper piece image 140. The reconfiguring module 105 arranges the paper piece images 140 of the number of copies on a printable area of one or more pages based on a printable size and the paper piece size 130 and add a guide image to generate the reconfigured image 150, the printable size being a size of the printable area, the guide image being an image of a guide for dividing the paper piece images 140 of the number of copies. As a result, paper pieces of the necessary number of copies are created from one original paper piece. Further, by arranging multiple paper piece images on a printable area, less number of sheets of paper is used. Since the printed paper has the guide image added, it guides a user to cut the print paper (after printed) into paper pieces. It is easy for the user to cut the print paper (after printed) into paper pieces.

(2) According to the present embodiment, the image obtaining module 102 obtains paper piece images 140 of double sides. The size detector module 103 detects the paper piece sizes 130 of the double sides. The clipper module 104 adjusts the paper piece image 140 of one side, which has a smaller paper piece size 130, with reference to the paper piece image 140 of another side, which has a larger paper piece size 130, to generate paper piece images 140 of the double sides having a same size. The reconfiguring module 105 arranges the paper piece images 140 on the printable area such that the paper piece images 140 of the double sides of the same size are arranged on duplex sides to generate the reconfigured images 150 of the double sides, and adds the guide image to the reconfigured image 150 of at least one side. As a result, by rotating or centering the smaller paper piece image 140 of one side with reference to the larger paper piece image 140 to adjust the smaller paper piece image 140 of one side, natural duplex-printed paper pieces just like finished products are created.

(3) According to the present embodiment, the reconfiguring module 105 arranges the paper piece images 140 on the printable area such that a number of total cuttings is minimum, where paper on which the reconfigured image 150 is printed is to be cut into paper pieces. As a result, it saves a user from having to cut the paper many times.

(4) According to the present embodiment, the reconfiguring module 105 arranges the paper piece images 140 on the printable area such that a number of total cuttings is minimum, where paper on which the reconfigured image 150 is printed is to be bent and then cut into paper pieces, and add, as the guide image, an image showing a bend line on a margin. As a result, it further saves a user from having to cut the paper many times.

(5) According to the present embodiment, the reconfiguring module 105 downsize the paper piece image 140, arrange downsized paper piece images 140 on the printable area, and add the image showing the bend line on a margin generated as a result of the downsizing. As a result, even if the number of total cuttings is not reduced without downsizing the paper piece image 140, the number of total cuttings is reduced by downsizing the paper piece image 140. Where the paper piece image 140 is downsized and then the image showing the bend line is added on a margin generated as a result of the downsizing, the paper piece image 140 should be downsized at the least scaling (i.e., with reducing size as less as possible). Then the product is not too small and is user friendly.

(6) According to the present embodiment, the reconfiguring module 105 downsizes the paper piece image 140 and arrange downsized paper piece images 140 on the printable area to reduce a number of total pages of the reconfigured image 150. As a result, even if the number of total pages is not reduced without downsizing the paper piece image 140, the number of total pages is reduced by downsizing the paper piece image 140, and less number of sheets of paper is used. Also, where the paper piece image 140 is downsized and then the number of total pages of the reconfigured image 150 is reduced, the paper piece image 140 should be downsized at the least scaling (i.e., with reducing size as less as possible). Then the product is not too small and is user friendly.

(7) According to the present embodiment, the reconfiguring module 105, where the paper piece images 140 of the number of copies are arranged in the printable area and the printable area has a space, further arrange the paper piece image(s) 140 of a maximum number arrangeable on the space. As a result, paper pieces of the maximum number of copies are created for extra (i.e., spare) copies.

(8) According to the present embodiment, the reconfiguring module 105 detect a blank area included in the paper piece image 140, and add a unique object to the blank area of each of the paper piece images 140 to generate the reconfigured image 150. As a result, multiple different paper pieces are created from one original paper piece. For example, message cards having different names (students' names), raffle tickets having different lottery random numbers, paper pieces having unique identifiers (serial numbers, etc.) for copy protection, paper pieces having two dimensional codes or barcodes, and paper pieces having serial numbers are created. In many educational sites such as schools, paper pieces are printed (almost handmade). According to the present embodiment, this handmade-printing process is simplified, teachers' burdens are reduced, and professional-looking and heartwarming content can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
   a controller circuitry that executes an image forming program to operate as
   a variable determining module configured to determine a number of copies,
   an image obtaining module configured to obtain an original image including an object of a paper piece,
   a size detector module configured to detect a paper piece size, the paper piece size being a size of the object of the paper piece included in the original image,
   a clipper module configured to clip the object of the paper piece having the paper piece size from the original image to generate a paper piece image, and
   a reconfiguring module configured to arrange the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies, wherein the image obtaining module is configured to obtain paper piece images of double sides, the size detector module is configured to detect the paper piece sizes of the double sides, the clipper module is configured to adjust the paper piece image of one side, which has a smaller paper piece size, with reference to the paper piece image of another side, which has a larger paper piece size, to generate paper piece images of the double sides having a same size, and the reconfiguring module is configured to
- arrange the paper piece images on the printable area such that the paper piece images of the double sides of the same size are arranged on duplex sides to generate the reconfigured images of the double sides, and
- add the guide image to the reconfigured image of at least one side.

2. The image forming apparatus according to claim 1, wherein
the reconfiguring module is configured to arrange the paper piece images on the printable area such that a number of total cuttings is minimum, where paper on which the reconfigured image is printed is to be cut into paper pieces.

3. The image forming apparatus according to claim 1, wherein
the reconfiguring module is configured to
- arrange the paper piece images on the printable area such that a number of total cuttings is minimum, where paper on which the reconfigured image is printed is to be bent and then cut into paper pieces, and
- add, as the guide image, an image showing a bend line on a margin.

4. The image forming apparatus according to claim 3, wherein
the reconfiguring module is configured to downsize the paper piece image, arrange downsized paper piece images on the printable area, and add the image showing the bend line on a margin generated as a result of the downsizing.

5. The image forming apparatus according to claim 1, wherein
the reconfiguring module is configured to downsize the paper piece image and arrange downsized paper piece images on the printable area to reduce a number of total pages of the reconfigured image.

6. The image forming apparatus according to claim 1, wherein
the reconfiguring module is configured to, where the paper piece images of the number of copies are arranged in the printable area and the printable area has a space, further arrange the paper piece image(s) of a maximum number arrangeable on the space.

7. The image forming apparatus according to claim 1, wherein
the reconfiguring module is configured to detect a blank area included in the paper piece image, and add a unique object to the blank area of each of the paper piece images to generate the reconfigured image.

8. An image forming method, comprising:
determining a number of copies;
obtaining an original image including an object of a paper piece;
detecting a paper piece size, the paper piece size being a size of the object of the paper piece included in the original image;
clipping the object of the paper piece having the paper piece size from the original image to generate a paper piece image; and
arranging the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies, wherein the image obtaining step includes obtaining paper piece images of double sides, the size detecting step includes detecting the paper piece sizes of the double sides, the clipping step includes adjusting the paper piece image of one side, which has a smaller paper piece size, with reference to the paper piece image of another side, which has a larger paper piece size, to generate paper piece images of the double sides having a same size, and the reconfiguring step includes
- arranging the paper piece images on the printable area such that the paper piece images of the double sides of the same size are arranged on duplex sides to generate the reconfigured images of the double sides, and
- adding the guide image to the reconfigured image of at least one side.

9. The image forming method according to claim 8, wherein
the reconfiguring step includes arranging the paper piece images on the printable area such that a number of total cuttings is minimum, where paper on which the reconfigured image is printed is to be cut into paper pieces.

10. The image forming method according to claim 8, wherein
the reconfiguring step includes
- arranging the paper piece images on the printable area such that a number of total cuttings is minimum, where paper on which the reconfigured image is printed is to be bent and then cut into paper pieces, and
- adding, as the guide image, an image showing a bend line on a margin.

11. The image forming method according to claim 10, wherein
the reconfiguring step includes downsizing the paper piece image, arranging downsized paper piece images on the printable area, and adding the image showing the bend line on a margin generated as a result of the downsizing.

12. The image forming method according to claim 8, wherein
the reconfiguring step includes downsizing the paper piece image and arrange downsized paper piece images on the printable area to reduce a number of total pages of the reconfigured image.

13. A non-transitory computer readable recording medium that stores an image forming program executable by a controller circuitry of an image forming apparatus, the image forming program causing the circuitry of the image forming apparatus to operate as a variable determining module configured to determine a number of copies, an image obtaining module configured to obtain an original image including an object of a paper piece, a size detector module configured to detect a paper piece size, the paper piece size being a size of the object of the paper piece included in the original image, a clipper module configured to clip the object of the paper piece having the paper piece size from the original image to generate a paper piece image, and a reconfiguring module configured to arrange the paper piece images of the number of copies on a printable area of one or more pages based on a printable size and the paper piece size and add a guide image to generate a reconfigured image, the printable size being a size of the printable area, the guide image being an image of a guide for dividing the paper piece images of the number of copies, wherein the image obtaining module is configured to obtain paper piece images of double sides, the size detector module is configured to detect the paper piece sizes of the double sides, the clipper module is configured to adjust the paper piece image of one side, which has a smaller paper piece size, with reference to the paper piece image of another side, which has a larger paper piece size, to generate paper piece images of the double sides having a same size, and the reconfiguring module is configured to arrange the paper piece images on the printable area such that the paper piece images of the double sides of the same size are arranged on duplex sides to generate the reconfigured images of the double sides, and add the guide image to the reconfigured image of at least one side.

14. The non-transitory computer readable recording medium according to claim 13, wherein the reconfiguring module is configured to arrange the paper piece images on the printable area such that a number of total cuttings is minimum, where paper on which the reconfigured image is printed is to be cut into paper pieces.

15. The non-transitory computer readable recording medium according to claim 13, wherein the reconfiguring module is configured to arrange the paper piece images on the printable area such that a number of total cuttings is minimum, where paper on which the reconfigured image is printed is to be bent and then cut into paper pieces, and add, as the guide image, an image showing a bend line on a margin.

16. The non-transitory computer readable recording medium according to claim 15, wherein the reconfiguring module is configured to downsize the paper piece image, arrange downsized paper piece images on the printable area, and add the image showing the bend line on a margin generated as a result of the downsizing.

17. The non-transitory computer readable recording medium according to claim 13, wherein the reconfiguring module is configured to downsize the paper piece image and arrange downsized paper piece images on the printable area to reduce a number of total pages of the reconfigured image.

* * * * *